Oct. 6, 1964     C. A. ESCOFFERY     3,151,379
SOLAR BATTERY AND METHOD OF MAKING IT
Original Filed March 23, 1959
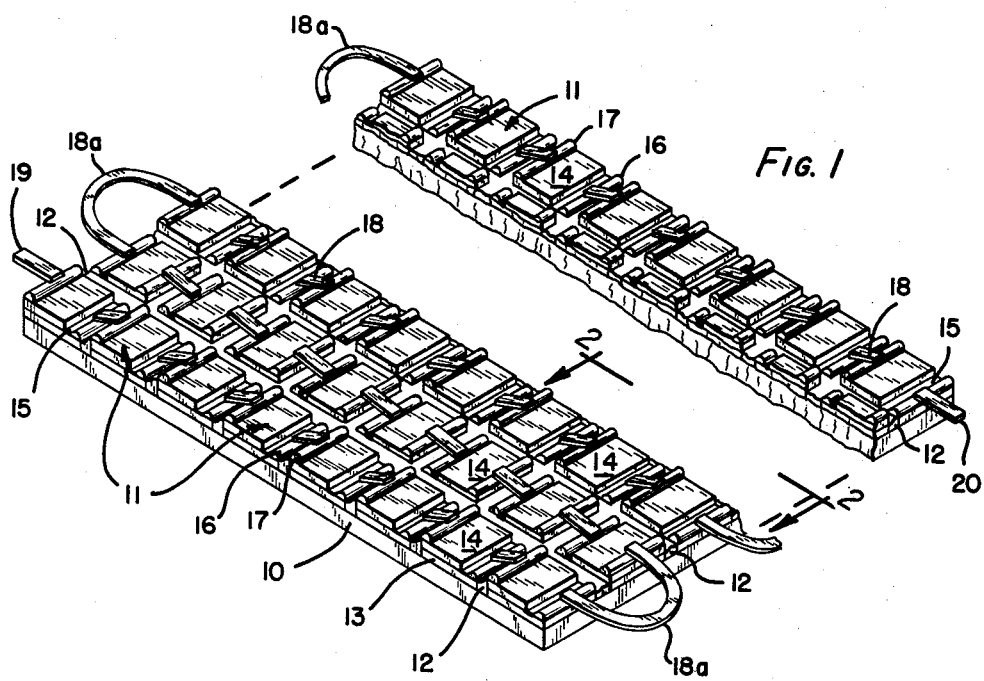
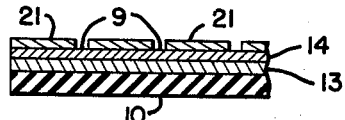
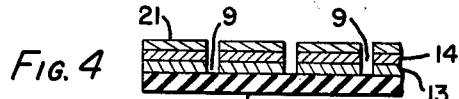
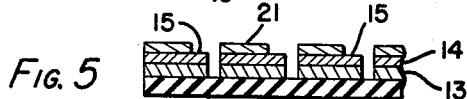
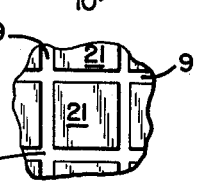
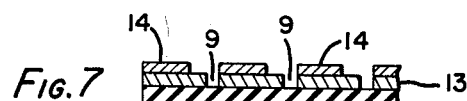
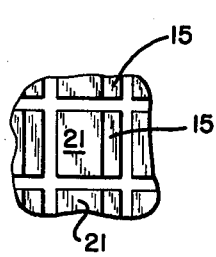
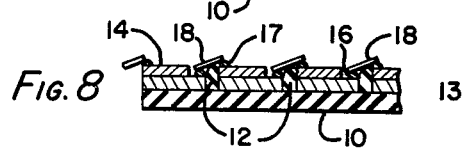
INVENTOR.
CHARLES A. ESCOFFERY
BY
ATTORNEYS.

United States Patent Office
3,151,379
Patented Oct. 6, 1964

3,151,379
SOLAR BATTERY AND METHOD OF MAKING IT
Charles A. Escoffery, Los Angeles, Calif., assignor to International Rectifier Corporation, El Segundo, Calif., a corporation of California
Original application Mar. 23, 1959, Ser. No. 801,234. Divided and this application July 3, 1961, Ser. No. 132,253
6 Claims. (Cl. 29—25.3)

This invention relates to solar energy converters, and more particularly to such converters capable of developing relatively high voltage.

The principal object of the invention is to provide an effective arrangement of a battery of solar or photovoltaic cells and a simple way of assembling it.

Solar energy batteries or converters are well known. They commonly comprise a number of photovoltaic cells connected together in a manner to produce the desired overall voltage and current carrying capacity. A common form of a photovoltaic cell useful for this purpose comprises a wafer of silicon of a selected conductivity type having diffused into a surface thereof a doping material or impurity of a character which creates in the surface region a conductivity of the opposite type. This creates a PN junction near the surface. The action of light directed on such a surface generates a voltage in the region of the junction in a well known manner, this voltage being of the order of about a half volt per cell. A voltage much higher than that of a single cell is obtainable by connecting a plurality of such cells in series, which can be done by connecting the sub-surface portions of the wafer of one cell with the surface of the next cell in the battery of cells.

In accordance with the present invention I provide a unique and convenient arrangement for a battery of such cells capable of exposing a wide surface area to light, and I also provide a simple process for manufacturing the battery.

I carry out the process by fastening to a base support a relatively large area or wafer of semi-conductor material, preferably silicon, which has been made to have a desired conductivity type, that is, either the N-type or the P-type. I form a surface layer on this area or wafer of the opposite conductivity type from that of the remainder of the wafer which may readily be done by suitable diffusion at the surface with a desired doping material to produce such opposite conductivity type. This operation of producing the layer of opposite conductivity type is well understood; and it results in the formation of the desired PN junction at the surface region.

In accordance with a feature of my invention I divide this relatively large area or wafer provided with the PN junction into a number of individual and electrically separated areas which form individual cells. I carry this out by applying a masking material having the area and dimensions of the desired individual cells; and this masking material is applied in such a way as to leave a separation between all of the individual areas of the masking material. By applying a suitable dissolving or etching substance to the masked surface, the material of the semiconductor area or wafer is dissolved out at the region between the masked areas, thereby producing the desired individual cells electrically unconnected with each other.

According to a further feature of the process I then remove some of the masking material from the surface of each individual cellular area, and then apply a suitable etching or dissolving solution to these areas last removed, but only sufficient to remove the surface layer from each cell to expose the sub-surface or main wafer portion beneath.

To the main wafer portion I attach a suitable electrical connector or lead, and I also apply a suitable electrical connector or lead to the surface area of each cell after removing the wax mask. This leaves the plurality of individual cells each having a connector attached to its surface area and a connector attached to its sub-surface region. By connecting the sub-surface region of one cell with the surface area of another, a series arrangement of cells can be made which will build up the desired high voltage.

Preferably insulating material is placed between the individual cells to prevent inadvertent short-circuiting from one cell to the next.

The foregoing and other features of the invention will be better understood from the following detailed description and the accompanying drawing of which:

FIG. 1 is an isometric top view of a battery of photovoltaic cells arranged according to this invention;

FIG. 2 is a cross-section view taken at line 2—2 of FIG. 1 showing a portion of the area of the battery as it is being constructed and depicting a semi-conductor wafer or layer on a base support and having a surface layer of the opposite conductivity type from that of the rest of the wafer;

FIG. 3 shows the same view as FIG. 2 and also an arrangement of masking areas on the upper surface;

FIG. 3a is a fragmentary face view of a part of the structure represented in FIG. 3;

FIG. 4 shows the view of FIG. 3 but with the wafer material in the regions between the masking areas removed;

FIG. 5 shows the view of FIG. 4 but with some of the masking material of each masking area removed;

FIG. 5a is a fragmentary face view of a part of the structure represented by FIG. 5;

FIG. 6 shows the same view as FIG. 5 but with the upper surface of the semi-conductor material removed at each area where the masking material has been removed;

FIG. 7 shows the same view as FIG. 6 but with all of the masking areas removed; and FIG. 8 shows the same view as FIG. 7 but with electrical connecting elements attached to each cell with provision for connecting one cell with the next.

Referring to FIG. 1 of the drawings, there is shown a base or mounting support 10 of electrical insulating material which may be glass or porcelain or other ceramic material of high purity and which may have a square or rectangular shape, as shown. There are fixed on the base a plurality of photovoltaic cells 11 side by side over the surface of the base and separated from each other by insulating material 12. Each cell 11 comprises a wafer or layer 13 of semi-conductor material, preferably silicon, which is selected to have a desired type of conductivity, such as the N-type conductivity. Each of these wafers is shown of square or rectangular shape so that a large number of the wafers will conveniently fit the square or rectangular shape of the base panel 10. In accordance with a practice common in the making of such photovoltaic cells, the upper surface 14 of each cell is made to have a conductivity of the opposite type from that of the rest of the wafer semi-conductor material of the cell. Thus, if the main wafer of the cell is of the N-type conductivity, the surface layer 14 will be made to have the P-type conductivity so that a P-N junction is formed at the interface region of the wafer and its surface layer 14. As is well known, the effect of light, such as sun light, directed on the surface layer 14 generates a voltage at the PN-junction. The surface layer 14 of each cell is made less than fully co-extensive with the area of the wafer 13. Thus, along the right-hand margin of each cell 11, as seen in FIG. 1, there is a strip 15 which is not covered by the surface layer 14, but which instead leaves the main semi-conductor material of wafer 13 exposed. Along this exposed margin of each wafer 13 there is attached or affixed a strip 16 of electrical conducting material making good electrical connection with the respective wafer 13. The strip 16 constitutes one of the terminals of the respective photovoltaic cell 11. The other terminal of each of the cells is provided by another strip 17 attached or affixed to the surface layer 14, and the strip 17 is located at the opposite side of the cell from the terminal strip 16 of the cell.

All of the photovoltaic cells of FIG. 1 are shown connected in series by means of electrical connectors 18 each of which extends from a terminal strip 16 of one cell to the adjacent terminal strip 17 of the next adjacent cell, and by connectors 18a which extend from a terminal strip 16 of a cell at the end of one row of cells to the terminal member 17 of the end cell of the next row. This battery of series connected photovoltaic cells then develops its full voltage across output terminals 19 and 20, the terminal 19 being connected to the terminal strip 17 in the end cell of the row of cells at one end of the panel 10, and the terminal 20 being connected to the terminal strip 16 of the end cell in the row at the opposite end of the panel 10.

A preferred method of making this battery in accordance with the present invention is illustrated in FIGS. 2 to 8 which show a cross-section taken at line 2—2 of FIG. 1 and showing the material and construction associated with three adjacent ones of the cells in the row at the line 2—2. Thus, there is applied and affixed to the base panel 10 a solid and uniform layer of the semi-conductor material 13 which is preferably silicon, although it should be understood that other semi-conductor material such as germanium could be used instead. The semi-conductor material may be applied in a suitable manner. A preferred way is to apply it to the panel by depositing it in a vapor phase. Silicon, for example, can be deposited by passing a suitable silicon compound, such as silicon tetrachloride in vapor phase over the base panel 10, preferably a material such as a high-purity ceramic or porcelain which for this purpose is heated. The silicon will deposit from the silicon compound on the panel under this condition in a manner described hereinafter in greater detail; and to give the silicon its desired type of conductivity suitable doping material is included in the vapor. Thus, to produce N-type silicon on the panel, a doping material such as arsenic may be used.

Following this, the surface layer 14 is applied, which in the case of N-type silicon for the layer 13, may be done by diffusing into the upper surface a substance such as boron, aluminum, gallium or indium, which will cause the silicon of layer 14 to be of the P-type. When boron is used for the doping material, for example, the boron diffusion can effectively be carried out in a well known manner by application of boron trichloride to the silicon surface at a high temperature, for example, around 1000° C.

Following the application of the surface layer 14, the size and shape of the ultimate individual cells are then established by a masking operation. This is accomplished by applying to surface 14 a suitable masking material 21 (FIGS. 3 and 3a) coinciding in dimensions with the dimensions of the cell. Thus, if each individual cell is to be a rectangle one-half centimeter by two centimeters, for example, this will be the dimensions of each of the masking areas 21. The masking material may be any of the well known materials used for such purposes which is adherent to the semi-conductor, such as for example, a wax of which any of a number may be used, for example bee's wax or paraffin or a suitable sealing wax, or the like. Each of these coverings of masking material 21 will have spaces 9 around them to separate them from each of the other adjacent masking areas, as shown in FIGS. 3 and 3a. An etching solution is then applied to the surface, and the solution should be one which readily attacks the semi-conductor material and does not readily attack the masking material.

A suitable etching solution for use with silicon semi-conductor is an acid such as hydrochloric acid or nitric acid or a mixture of hydrochloric and nitric acids. By this treatment the semi-conductor will be dissolved or removed at the regions between the masking areas 21 to expose the base panel 10 and thereby cause the spaces 9 to form down to the panel 10 as shown in FIG. 4. This will produce the desired separation of the individual semi-conductor areas from each other to constitute the separate cells. The masking material 21 is then removed along a side of each cell area to uncover part of the surface layer 13 of the semi-conductor, this uncovered portion being the area 15 of each cell shown in FIGS. 5 and 5a. The removal of the masking material from over the regions 15 may be accomplished for example by dissolving it in a solvent for the masking material, while protecting the remainder of the masking material by a suitable protective coating or mask of its own which is not so dissolved. It is noted that in one row of cells the areas 15 are located along the right side of the cell area (as seen in FIG. 5a) and in the next adjacent row the areas 15 are located along the left side of the cell area.

a base, such as base 10, the silicon will deposit on the

Following this, the etching solution is again applied, but only sufficiently to remove the surface layer 14 of the semi-conductor to leave the main semi-conductor body 13 exposed at the areas 15, as shown in FIG. 6. Then the masking material is removed which can be done in the case of a wax masking material by dissolving in a solvent such as trichlorethylene or a chlorinated hydrocarbon or the like. This will leave the structure in the form shown in FIG. 7. Following this, the spaces 9 between the individual semi-conductor elements 13 are preferably filled with the insulating material 12 to prevent short circuits. This material 12 may be a suitable insulating resin or varnish preferably of high quality which can be readily applied in liquid or fluid form and allowed to solidify.

The cells are now ready to be series connected, which is done by connecting the P-type region of one cell with the N-type region of the next. For this purpose the strips 16 and 17 shown in FIG. 1 are applied. The strips for the P regions may be aluminum and the strips for the N regions may be antimony or metals and alloys containing antimony, or arsenic, or phosphorus. Thus strips 16 may be antimony and strips 17 aluminum. These strips may be applied by depositing them in a vacuum from the respective metals in vapor phase. Since it is difficult to apply heavy deposits of aluminum by vacuum evaporation, the aluminum strips may, if desired, first be cut to size and then fused in place; and the antimony or metals and alloys containing antimony, or arsenic, or phosphorus could be similarly applied if desired.

Then the connectors 18 are applied which can be done by fusing them as metal strips to the strips 16 and 17. A preferred way is to form the connectors 18 by evaporating a metal such as silver in vacuum and depositing it as the strips 18, in which case they would rest on the insulation 12 and also connect with strips 16 and 17. The strips 18a, 19 and 20 may be metal strips fused to the respective terminals.

Although the material of wafer or layer 13 has been suggested as N-type semi-conductor it will be understood that it may, if desired, be of P-type semi-conductor instead. The choice of the N or P-type is made, as is well known, by the selection of doping material or impurity incorporated into the semi-conductor. For example, to make the material 13 of N-type silicon the silicon can be doped with an element of Group V of the periodic table, such as arsenic, and if on the other hand it is desired to make the material 13 of P-type silicon, the silicon can be doped with an element from Group III of the periodic table, such as boron. It follows that if semi-conductor 13 is N-type, its surface layer 14 will be P-type, which can be accomplished by doping the silicon at the surface with a Group III element. If layer 13 is to be P-type, then the surface layer will be N-type which can be accomplished by doping the surface with a Group V element.

Regardless of whether it is the N or the P-type, the substance 13 is preferably made very thin, such as the order of few thousandths inch, for example .0005 to .0030 inch in thickness. In some cases it may be made much thinner, such as the order of .0001 to .0002 inch thick, which is about the same order of thickness as the thickness which is desired of surface layer 14.

It will be recognized that the thicknesses of layers and material shown in the drawings are not in proportion to their actual thicknesses. In general, for ease of illustration, in the drawings the various parts are shown proportionately much thicker than they will actually be made.

The wafers or layers 13 and 14 can be formed in any of a number of ways, depending somewhat on the size of the area and other factors. It would be desirable from the standpoint of conversion efficiency to make the semi-conductor a monocrystalline structure, such as a single silicon crystal. It may be possible to do this, particularly where the surface area is not too large. But it may be easier instead, to provide a polycrystalline material 13, which may be done in any of a number of ways such as powder metallurgy or vacuum evaporation or a vapor phase deposition. These several techniques have heretofore been used in connection with semi-conductor materials.

In the powder metallurgy technique, the silicon is used in the form of finely divided particles or powder doped with a suitable material to create either the N or P-type silicon, and the powder be compressed onto the base 10 at a high pressure such as the order of 25,000 pounds per square inch at an elevated temperature such as 900 to 1200 degrees centigrade. This will cause sintering of the silicon particles and attendant coalescing, after which the silicon is annealed in a suitable oven at a high temperature which may be somewhat less than 900° C. This will result in a polycrystalline structure for the semi-conductor 13, and it will be adherent to the base. To provide the surface layer 14 of the opposite conductivity type, a suitable doping material can be imparted to this surface layer 14. For example, if material 13 is of the N-type silicon, its surface 14 can be converted to the P-type by passing a compound such as boron trichloride over it in vapor form at high temperature, which will cause some boron to enter the surface layer 14 to create the P-type silicon.

In the vacuum evaporation technique the process can be similar to that used by industry for many metals and materials. To adapt it to silicon deposition, the silicon is placed in a boat or crucible in an evacuated container and heated to evaporate the silicon. The base, such as the base 10 on which the silicon is to be coated, will be placed in the evacuated container so that the evaporated silicon deposits on it and adheres to it; and the desired doping material will be present to cause the silicon to take its desired N or P-type conductivity. After the material 13 is thus applied, the surface layer 14 of the opposite conductivity type will be formed in any desired manner as mentioned above, for example by exposing the surface 14 to the appropriate kind of doping material either in the vacuum or out of vacuum.

The vapor phase deposition technique is carried out in a known manner of depositing silicon from a suitable silicon compound; and this procedure may be used to deposit the substance 13 and cause it to be adherent to its base. It can be done for example by reduction of silicon tetrachloride with zinc vapor, or by hydrogen reduction of silicon tetrachloride, silicon tetrabromide or trichlorosilane; or again it may be done by thermal decomposition of silicon tetraiodide or of silane. By passing a gas of a silicon compound selected from the above group over base. As in the other processes, a suitable doping material will be supplied to provide the desired N or P-type conductivity.

In the appended claims, for the cake of definition, the semi-conductor material 13 is generally referred to as a wafer even though it is usually very thin; and the surface 14 is referred to as the surface layer.

The battery can be made with almost any desired number of cells, for example, 100 to 300 cells; and it is entirely practical to obtain output voltages of 25 to 150 volts. The dimensions of the individual cells may be as desired in accordance with the desired current output. The area of each individual cell may for example be of the order of one centimeter by one centimeter, or one-half centimeter by two centimeters or one-half centimeter by six centimeters, or the like.

While the invention has been described with particular reference to silicon as the semi-conductor material, it should be understood that other semi-conductor material may be used instead if desired. For example, it may be possible to use germanium, and the formation of germanium P–N junctions is well known. Also it may be possible to use cadmium sulphide or gallium arsenide instead of silicon.

It will be recognized that by my invention there is provided an efficient and relatively inexpensive form of solar converter which can be adapted to a wide range of voltage and current. By the simple step of connecting sufficient cells in series desired values of output voltage may be obtained. It will be understood that in order to build up the current output capacity the individual cells may be made sufficiently large, or else cells may be connected in multiple. The arrangement adapts itself readily to any desired combination of series and parallel arrangement to obtain the desired voltages and currents.

This application is a division of my copending application, Serial No. 801,234, filed March 23, 1959, and entitled "Solar Battery and Method of Making It" (now abandoned).

It will be recognized that modification within the scope of the invention may suggest themselves to those skilled in the art, and the invention is not limited except in accordance with the scope of the appended claims.

What is claimed is:

1. The method of making a solar energy converter which comprises:
    (a) applying a coating of semi-conductor material of one of the conductivity types on an insulating base,
    (b) doping the surface of the semi-conductor material to create a surface layer of the conductivity type opposite that of the first-mentioned conductivity type,
    (c) applying masking material over the surface layer at separated areas which define the areas of individual cells,
    (d) removing the surface layer and the coating of semi-conductor material at the regions between said separated areas of masking material,
    (e) removing the masking material from a part of each of said separated areas,
    (f) removing the surface layer at each of the last-mentioned parts to expose the subsurface semi-conductor material thereat,
    (g) removing the remainder of the masking material, and
    (h) applying a first terminal strip to the surface layer of each cell and a second terminal strip to the exposed subsurface semi-conductor material of each cell.

2. The method as defined in claim 1, including the steps of applying an insulating material to the insulating base in the regions whereat the surface layer and the coating of semi-conductor material have been removed in step (d) and electrically connecting the first and second terminal strips of a plurality of the adjacent cells.

3. The method as defined in claim 1, in which the semi-conductor material is silicon.

4. The method as defined in claim 1, in which the subsurface semi-conductor material is P-type silicon and the surface layer thereof is N-type silicon.

5. The method as defined in claim 1, in which the first terminal strip is constituted of aluminum and the second terminal strip is constituted of a material selected from the group consisting of antimony, arsenic and phosphorus.

6. The method of making a solar energy converter which comprises:
   (a) vapor depositing a silicon semi-conductor body of P-type conductivity on an insulating base;
   (b) diffusing boron trichloride into the upper surface of said body to create an N-type silicon surface layer;
   (c) applying a wax masking material over the N-type silicon surface layer at separated areas which define the areas of individual cells;
   (d) etching the N-type silicon surface layer and the P-type silicon body with an acid etchant to expose the surface of the insulating base in the regions between said separated areas of said wax masking material;
   (e) dissolving the wax masking material from a part of each of said separated areas;
   (f) etching the N-type silicon surface layer at each of the last-mentioned parts with an acid etchant to expose the aligned parts of said P-type silicon semiconductor body;
   (g) dissolving the remainder of the wax masking material;
   (h) applying an insulating coating to the insulating base in the regions between said separated areas;
   (i) vapor depositing a first terminal strip constituted of aluminum on the exposed P-type silicon semiconductor body parts, and a second terminal strip constituted of a material selected from the group consisting of antimony, arsenic and phosphorus on the remaining N-type silicon surface layer of each cell; and
   (j) vapor depositing metallic connectors between the first and second terminal strips of the adjacent cells.

References Cited in the file of this patent

UNITED STATES PATENTS

| | | |
|---|---|---|
| 2,728,809 | Falkenthal | Dec. 27, 1955 |
| 3,012,920 | Christensen et al. | Dec. 12, 1961 |